H. W. OSTER.
MECHANISM FOR CLOSING AND FINISHING THE ENDS OF METAL TUBES.
APPLICATION FILED JAN. 13, 1917.
1,280,823.  Patented Oct. 8, 1918.
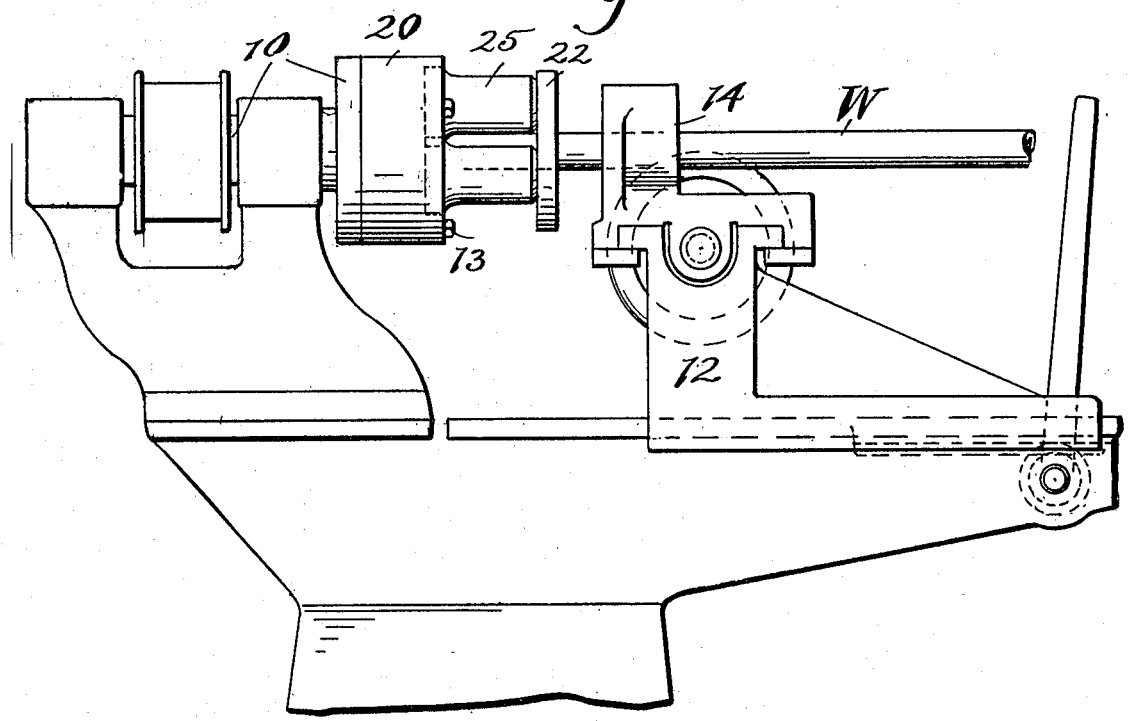
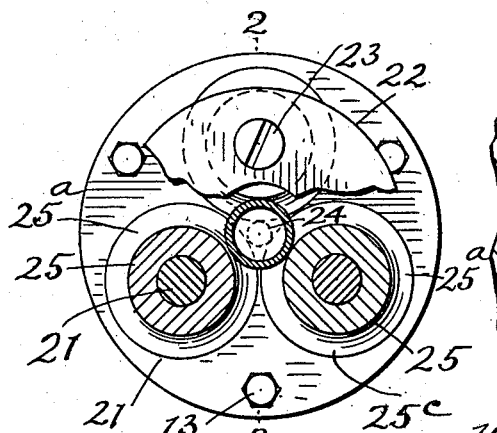
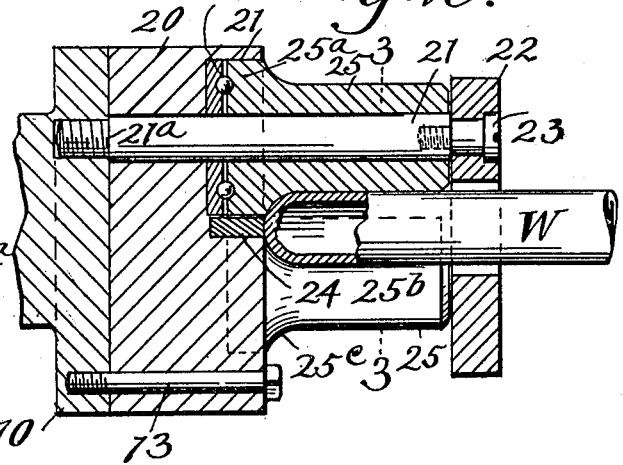
Inventor
Herman W Oster
By Thurston & Kwis
attys

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

MECHANISM FOR CLOSING AND FINISHING THE ENDS OF METAL TUBES.

1,280,823.     Specification of Letters Patent.     Patented Oct. 8, 1918.

Application filed January 13, 1917. Serial No. 142,146.

*To all whom it may concern:*

Be it known that I, HERMAN W. OSTER, a citizen of the United States, residing at Cleveland, in the county of Cuyahoga and State of Ohio, have invented a certain new and useful Improvement in Mechanism for Closing and Finishing the Ends of Metal Tubes, of which the following is a full, clear, and exact description.

The object of this invention is to cheaply make, from metal tubing, light, serviceable handles, of attractive appearance, for use in connection with die stocks and other tools and devices. The invention consists in the construction and combination of parts shown in the drawing and hereinafter described as definitely pointed out in the appended claims.

In the drawings, Figure 1 is a side elevation of a machine of the lathe type to which this invention is applied;

Fig. 2 is a central longitudinal section of the tube closing head with a tube therein, and Fig. 3 is a transverse sectional view in the plane of line 3—3 on Fig. 2.

Referring to the parts by reference characters, 10 represents the rotatable spindle of a lathe or other machine of like general character; 12 represents the sliding carriage of such a machine,—which carriage is provided with a suitable clamping device 14 adapted to hold a metal tube W in axial alinement with the spindle. These parts, in form suitable for the purpose, are known and therefore require no further explanation.

A tube closing head is fixed to the spindle 10, as by bolts 13, in axial alinement with it, whereby the rotation of the spindle will rotate the head. The head includes a head block 20 having, in its outer end, three cylindrical recesses 21 which are symmetrically disposed around the axis of the head and are equidistant from said axis. There are three spinning rolls 25 each having a cylindrical base 25ª which is rotatably fitted within one of said recesses; and there is an anti-friction thrust bearing 26 in said recess between the end of the roll and the bottom of the recess. Each roll has a body 25ᵇ which is cylindrical except that there is a portion 25ᶜ adjacent to the base which is flared outward on a curve which is approximately tangential with the end face of the head block 20 at its junction with the base 25ª.

Each of these rolls is rotatably supported by a shouldered stud 21 which goes through the block and screws into the end of the spindle 10 until the shoulder 21ª on said stud engages the end of the spindle.

A keeper plate 22 is secured against the ends of these three studs by screws 23 which go through the keeper plate and screw into the ends of the studs. This keeper plate aids in maintaining the parallelism of these studs with each other and with the axis of the head, and it likewise limits the endwise movement of the rolls upon the supporting studs.

A hardened steel plate 24 is inset into that part of the end of the block 20 which lies between the recesses 21.

A tube which is to have its end closed in and finished by the described mechanism is first heated at said end to welding heat. Then it is clamped to the carriage, and the carriage is moved to carry this hot end in between the three rolls and into contact with the flaring part thereof. While the carriage is being so moved the spindle and head are rotated, with the result that the end of the tube is spun inward and welded together by the action of the flaring parts of the rolls 25 and the hardened inset 24, it being understood that the carriage is moved constantly but slowly toward the head until this end is secured. The rolls 25 being free to rotate will do so while the head is rotating, and as a result of their contact with the non-rotating tube.

Having described my invention, I claim:

1. In mechanism for closing and finishing the ends of metal tubes, the combination of a rotatable head block and a plurality of spinning rolls rotatably supported by said head block on axes which are parallel with its axis,—each of said rolls being flared outward adjacent the end face of said head block on curved lines which are substantially tangential with the end face of said head block.

2. In mechanism for closing and finishing the ends of metal tubes, the combination of a rotatable head block, a plurality of spinning rolls which are supported upon the head block and are freely rotatable upon axes which are symmetrically arranged around the axis of the head block and are parallel thereto and equidistant therefrom, each of said rolls being flared outward adjacent the end face of said head block on curved lines which are substantially tangential to the end face of said head block.

3. In mechanism for closing and finishing the ends of metal tubes, the combination of a rotatable head block having in its end face a plurality of cylindrical recesses whose axes are all parallel with the axis of said head block and are equidistant therefrom, a like number of spinning rolls each having a cylindical body, a larger diametered cylindrical base, which is rotatably fitted within one of said recesses and a flaring portion which extends from said body to said base, and means by which these rolls are rotatably supported from said head block on axes which are parallel with its axis.

4. In mechanism for closing and finishing the ends of metal tubes, the combination of a rotatable head block having in its end face a plurality of cylindrical recesses whose axes are all parallel with the axis of said head block and are equidistant therefrom, a like number of spinning rolls each having a cylindrical body, a larger diametered cylindrical base, which is rotatably fitted within one of said recesses, and a flaring portion which extends from said body to said base, means by which these rolls are rotatably supported from said head block on axes which are parallel with its axis, and anti-friction thrust bearings interposed between the bottoms of said recesses and the adjacent ends of said rolls.

5. In mechanism for closing and finishing the ends of metal tubes, the combination of a rotatable head block having in its end face a plurality of cylindrical recesses whose axes are all parallel with the axis of said head block and are equidistant therefrom, a like number of spinning rolls each having a cylindrical body, a larger diametered cylindrical base which is rotatably fitted within one of said recesses and which has also a flaring portion which extends from said body to said base, means by which these rolls are rotatably supported from said head block on axes which are parallel with its axis, and anti-friction thrust bearings interposed between the bottoms of said recesses and the adjacent ends of said rolls, and a hard metal plate inset into the end face of said head block.

6. In mechanism for closing and finishing ends of metal tubes, the combination with a rotatable spindle, of a head block having a plurality of cylindrical recesses in its outer end face, means securing said head block to the end of said spindle, a plurality of studs fixed to said spindle and extending through said head block in axial relation to said cylindrical recesses, a keeper plate fixed to the outer ends of said studs, and a spinning roll rotatably mounted upon each stud and having a cylindrical base portion, which is rotatably fitted in the associated recess, and a cylindrical body, and an outwardly flared surface which joins said base and body.

7. In mechanism for closing and finishing ends of metal tubes, the combination with a rotatable spindle, of a head block having a plurality of cylindrical recesses in its outer end face, means securing said head block to the end of said spindle, a plurality of studs fixed to said spindle and extending through said head block in axial relation to said cylindrical recesses, a keeper plate fixed to the outer end of said studs, and a spinning roll rotatably mounted upon each stud and having a cylindrical base portion, which is rotatably fitted in the associated recess, and a cylindrical body, and an outwardly flared surface which joins said base and body, there being anti-friction thrust bearings in each recess around the stud and between the bottom of the recess and the end of the base of the associated roll.

In testimony whereof, I hereunto affix my signature in the presence of two witnesses.

HERMAN W. OSTER.

Witnesses:
R. B. TEUXSBURY,
E. L. THURSTON.